United States Patent
Zhang et al.

(10) Patent No.: US 8,274,447 B2
(45) Date of Patent: Sep. 25, 2012

(54) DIGITAL MOBILE USB TRANSCEIVER

(75) Inventors: Yang Zhang, San Diego, CA (US); Jack Steenstra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 666 days.

(21) Appl. No.: 12/407,634

(22) Filed: Mar. 19, 2009

(65) Prior Publication Data
US 2010/0142597 A1   Jun. 10, 2010

Related U.S. Application Data

(60) Provisional application No. 61/120,463, filed on Dec. 7, 2008.

(51) Int. Cl.
*H01Q 1/50* (2006.01)

(52) U.S. Cl. .......................................... 343/906; 343/872

(58) Field of Classification Search .................. 343/788, 343/869, 872, 879, 880, 882, 906
See application file for complete search history.

(56) References Cited

U.S. PATENT DOCUMENTS

| | | | |
|---|---|---|---|
| 6,758,689 B1* | 7/2004 | Bair et al. | 439/136 |
| 7,025,595 B1* | 4/2006 | Chan et al. | 439/6 |
| 7,289,530 B1 | 10/2007 | Yuan et al. | |
| 7,494,343 B2* | 2/2009 | Schriefer | 439/11 |
| 7,530,823 B1* | 5/2009 | Thornton et al. | 439/136 |
| 7,586,460 B2* | 9/2009 | Hunt et al. | 343/882 |
| 7,632,113 B2* | 12/2009 | Finn | 439/131 |
| 7,737,895 B2* | 6/2010 | Sanchez et al. | 343/702 |
| 2005/0130469 A1* | 6/2005 | Ikenoue | 439/131 |
| 2006/0251026 A1 | 11/2006 | Kalhan | |
| 2008/0192149 A1* | 8/2008 | Lee | 348/725 |
| 2009/0027561 A1* | 1/2009 | Cytera et al. | 348/729 |

(Continued)

FOREIGN PATENT DOCUMENTS

DE   202007003210   6/2007

(Continued)

OTHER PUBLICATIONS

Partial International Search Report—PCT/US2009/066824, International Search Authority—European Patent Office—Mar. 17, 2010.

(Continued)

*Primary Examiner* — Hoanganh Le
(74) *Attorney, Agent, or Firm* — Ryan N. Farr

(57) ABSTRACT

A digital mobile TV transceiver having improved performance is integrated as a USB dongle device for wireless devices. The antenna is not readily obvious to the user as it is hidden in the swing arms and cap of the device. The extendable arms act as telescoping antenna that increase the antenna length for improved antenna performance in the frequency range of 700 to 780 MHz. The antenna can swing into a position away from the body of the device, greatly improving the antenna gain performance and its radiation patterns. In addition, the antenna can be top-loaded design with dielectrics in the cap to further improve its performance. The USB transceiver comprises a USB adaptor, a retractable antenna, and a cap for protecting the USB adaptor when the antenna is retracted. The adaptor, antenna and cap lie in a plane rotatable by 360 degrees.

30 Claims, 4 Drawing Sheets

U.S. PATENT DOCUMENTS

| | | | |
|---|---|---|---|
| 2009/0066587 A1* | 3/2009 | Hayes et al. | 343/702 |
| 2009/0109113 A1* | 4/2009 | Crohas | 343/788 |
| 2010/0141847 A1* | 6/2010 | Jayaram et al. | 348/726 |

FOREIGN PATENT DOCUMENTS

| | | |
|---|---|---|
| EP | 1809033 | 7/2007 |
| EP | 2124297 | 11/2009 |
| FR | 2901064 | 11/2007 |
| WO | 2006022353 | 3/2006 |

OTHER PUBLICATIONS

International Search Report, PCT/US2009/066824, International Searching Authority, European Patent Office, Jun. 21, 2010.

Written Opinion, PCT/US2009/066824, International Searching Authority, European Patent Office, Jun. 21, 2010.

* cited by examiner

DIGITAL MOBILE USB TRANSCEIVER

BACKGROUND

1. Field

The present invention relates generally to wireless communications, and more specifically to reception of digital mobile television signals.

2. Background

Portable electronic devices allow users to be mobile. Instead of being fixed to a single location, a person can use a portable electronic device to work or enjoy entertainment at multiple locations. In addition to allowing mobility, users of the portable electronic devices also desire connectivity. As such, wireless connectivity is one of the fastest growing technologies over the last few years. A Wireless Local Area Network (WLAN), based on the Institute of Electrical and Electronic Engineers (IEEE) 802.11 standards and commonly known as "Wi-Fi" and "Vi-Fi", and mobile TV services standards such as MediaFLO, DVB-H, DVTDVB-T, ISDB-T, and CMMB, are examples of networks that promote wireless connectivity. Other standards also exist to govern wireless communications. Portable electronic devices, such as laptops, personal digital assistants, mobile telephones, gaming devices, etc., are often manufactured with the capability for wireless communication (i.e., wireless transmission and wireless reception of data) according to standards such as those discussed above. Fixed electronic devices, such as desktop Personal Computers (PCs), routers, printers, game stations, etc., may also have wireless capability installed during manufacturing. Universal Serial Bus (USB) ports are standard interfaces incorporated by the manufacturers of these portable and fixed wireless devices.

Wireless devices often require an antenna for adequate reception of wireless communications signals. Traditional WLAN and mobile TV antennas are usually internally enclosed in the main body of a receiving device, close to the Printed Circuit Board (PCB) and electronics of the device, which result in poor antenna gain performance and non-uniform radiation patterns. Traditional external antennas for mobile WLAN and TV receivers are inconveniently bulky and long, usually requiring connecting cables to enable placement of the antenna outside the range of interference from components of the wireless device itself such as keyboards, displays, power supplies and circuits boards.

Thus, there is a need in the art for an adjustable accessory transceiver/antenna device for digital mobile TV receivers and other wireless devices that can be conveniently plugged into the USB ports standard to personal computer and mobile wireless devices for receiving wireless signals and digital mobile TV services.

DETAILED DESCRIPTION

Figure 1:
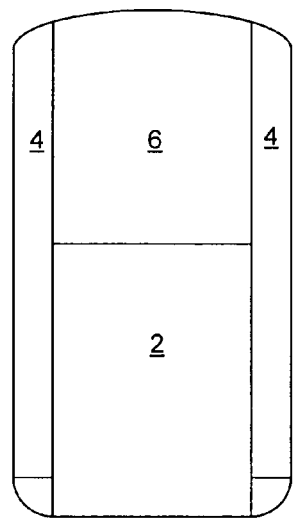
FIG. 1 illustrates a top view of one embodiment of the transceiver with antenna.

The word "exemplary" is used herein to mean "serving as an example, instance, or illustration." Any embodiment described herein as "exemplary" is not necessarily to be construed as preferred or advantageous over other embodiments.

An accessory device for wireless communications devices and digital mobile TV receivers that can be plugged into PCs and mobile devices to receive digital mobile TV services in standards such as MediaFLO, DVB-H, DVTDVB-T, ISDB-T, CMMB is disclosed. The novel transceiver is integrated into a USB dongle device. The transceiver antenna is not readily obvious to the user as it is hidden in the swing arms and cap of the device. The performance of the transceiver is exceptional as compared to many other types of traditional internal or inconvenient external antennas.

In one embodiment, the disclosed accessory device is a USB transceiver comprising a housing lying in a plane having a male USB connector at one end, an antenna assembly disposed about the housing on an opposite end of an axis there through, the antenna assembly being rotatable about the axis and through the plane and including a first elongated section coaxially disposed with a second elongated section, the first elongated section being at least partially retractable within and at least partially extendable through said second elongated section, and an impedance matching device spaced apart from said axis and connected to said first elongated section, said impedance matching device including a cap having a cavity capable of covering said USB plug in connection with rotating said antenna assembly in line with said USB connector and retracting said first elongated section. In an exemplary embodiment, the USB transceiver antenna assembly is a loop antenna. In another exemplary embodiment, the USB transceiver antenna assembly includes a first antenna and a second antenna, the first antenna and said second antenna each including a first elongated section and second elongated section extending from an axis. The first antenna and the second antenna lay spaced apart about the housing. The first elongated section of the first antenna is flexibly detachable from said impedance matching device.

In another embodiment, the disclosed accessory device is a USB transceiver comprising a USB adaptor, a retractable antenna coupled to the USB adaptor, and a cap, coupled to the retractable antenna, for protecting the USB adaptor when the antenna is retracted, wherein the adaptor, antenna and cap lie in a plane rotatable by 360 degrees about an axis of the plane. The retractable antenna may receive diversity signals such that mutli-path interference may be mitigated by the wireless device. Diversity signals may also comprise digital mobile TV services in standards such as MediaFLO, DVB-H, DVT-DVB-T, ISDB-T, CMMB. The cap may contain top loading, or impedance matching for improved antenna performance. In one embodiment, the antenna may be a loop antenna, single antenna or two independent antennas where a first arm of the antenna can be detached to provide two independent antennas. The antennas are rotatable away from interference generated by a device coupled to the USB adaptor. In yet another embodiment, the accessory device is an attached protective cover of a USB device having a body comprising a cap assembly including a telescoping antenna and USB connector associated therewith, wherein the cap assembly lies in a plane rotatable by 360 degrees about an axis of the plane. The cap assembly comprises the features detailed above.

FIG. 1 illustrates a top view of one embodiment of the transceiver with antenna (referenced herein as the transceiver device). The main body (or housing) 2 of the transceiver device contains a transceiver. As used herein, the term transceiver includes a receiver and transmitter each implemented as separate devices or the combination implemented in a single integrated device.

Figure 2:
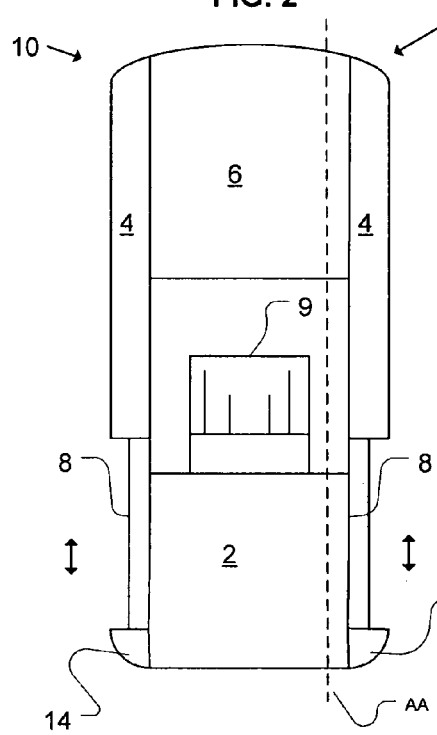
FIG. 2 illustrates a top view of the transceiver device exposing a USB connector.
Figure 3:
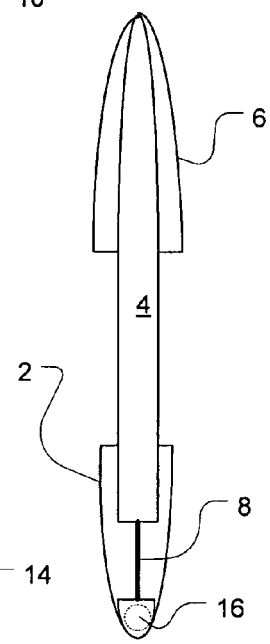
FIG. 3 illustrates a corresponding side view of the transceiver along an axis generally perpendicular to line A-A of FIG. 2.
Figure 4:
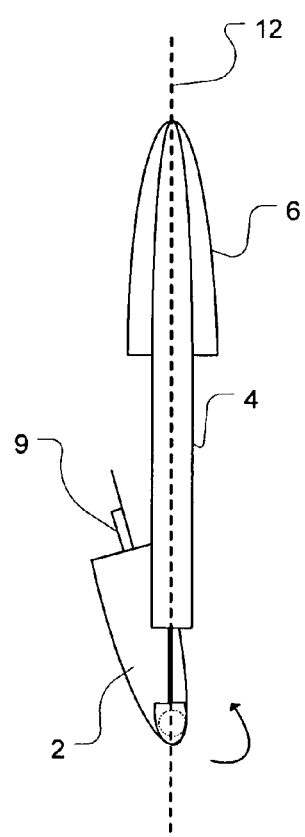
FIG. 4 which shows a further side view depicting the rotation of a transceiver through a plane on which the transceiver device lies.

While traditional internal antennas are usually in enclosed within the main body of a receiving device, close to the PCB and electronics of the device, resulting in poor antenna gain performance and non-uniform radiation patterns, the digital mobile TV antenna herein can receive for example, Media-FLO or other TV signals from an antenna integrated into the swing arm 4 and the USB cap 6 for improved performance. With reference to FIG. 2, which illustrates a top view of the transceiver device exposing USB plug 9, and FIG. 3, its corresponding side view along an axis generally perpendicular to line A-A of FIG. 2, each swing arm 4 extends by slidably engaging rail 8 thereby forming antenna 10. Each extendable arm 4, a pair of which may extend or retract in concert, act as an extendable/retractable antenna that can adjust the length of antenna 10 for improved antenna performance in the frequency range of 700 to 780 MHz. Each rail 8 may be implemented in a telescoping antenna fashion such that its length may be extended or contracted using well known telescoping antenna implementations. With reference to FIG. 4 which shows a further side view depicting antenna 10 swinging (or rather rotating) through plane 12, pivots 14 facilitate this movement by providing cam 16 about which antenna 10 can swing into a position away from body 2 to greatly improve the gain performance and radiation patterns of antenna 10. In addition, antenna 10 can be top-loaded with dielectrics (not shown) in cap 6 to further improve its performance.

Figure 5:
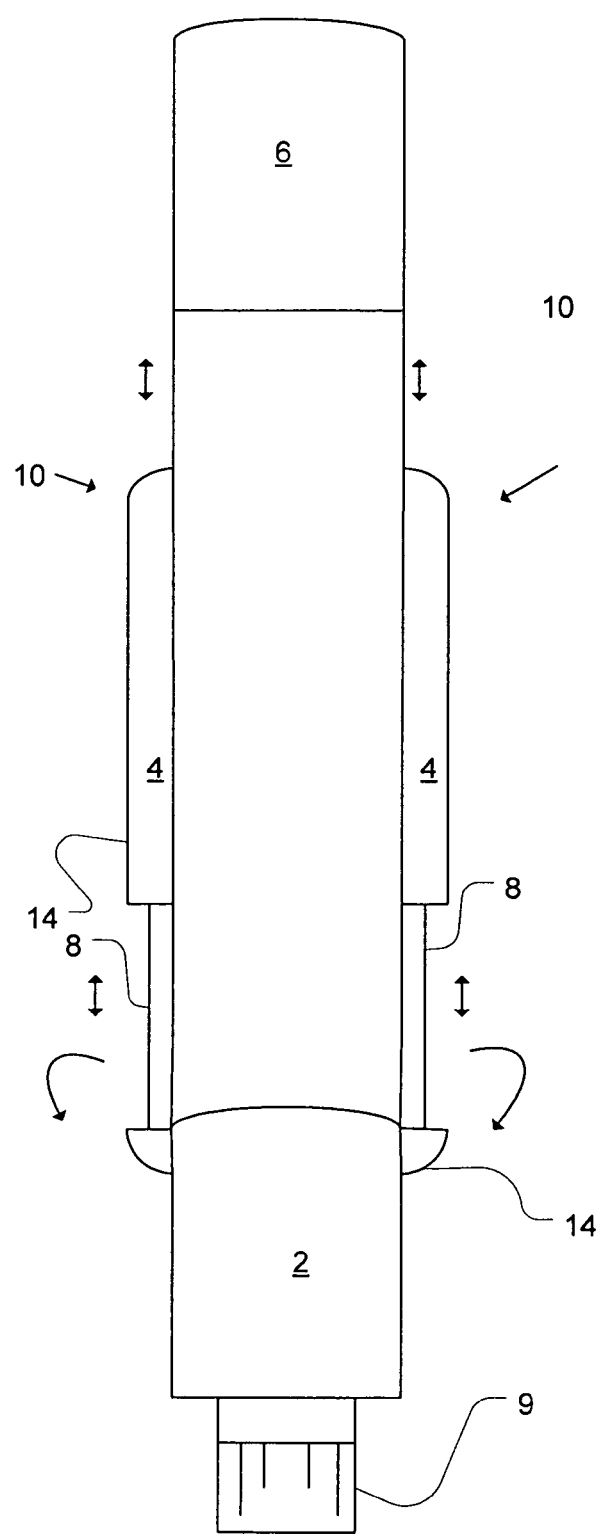
FIG. 5 illustrates a top view of a transceiver capable of pivoting at least 180° from a position where a USB cap can enclose a USB plug.

FIG. 5 illustrates a top view of antenna 10 rotated around pivots 14 to an extent which is 180° from a position where moving cap 6 can enclose USB plug 9. The cap 6 is extendable along the antenna 10. Pivots 14 may allow antenna 10 to lock at positions along a 360° angle of rotation.

Figure 6:
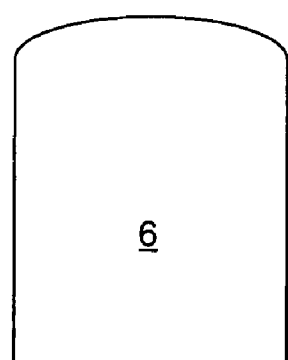
FIG. 6 illustrates a top view of an alternate embodiment of the invention wherein one antenna may flexibly detach from the USB cap.

FIG. 6 illustrates a top view of an alternate embodiment of the invention wherein one antenna 10a may flexibly detach from cap 6. Further, as shown cap 6 may rotate around antenna 10b. The antenna 10 may be detached from the moveable cap 6 to provide an optimal antenna length for maximum antenna performance. This embodiment provides two separate antennas which provide diversity reception of, for example, CDMA, UMTS, WiFi or, for instance, other systems where reception of multi-path signals are involved.

Figure 7:
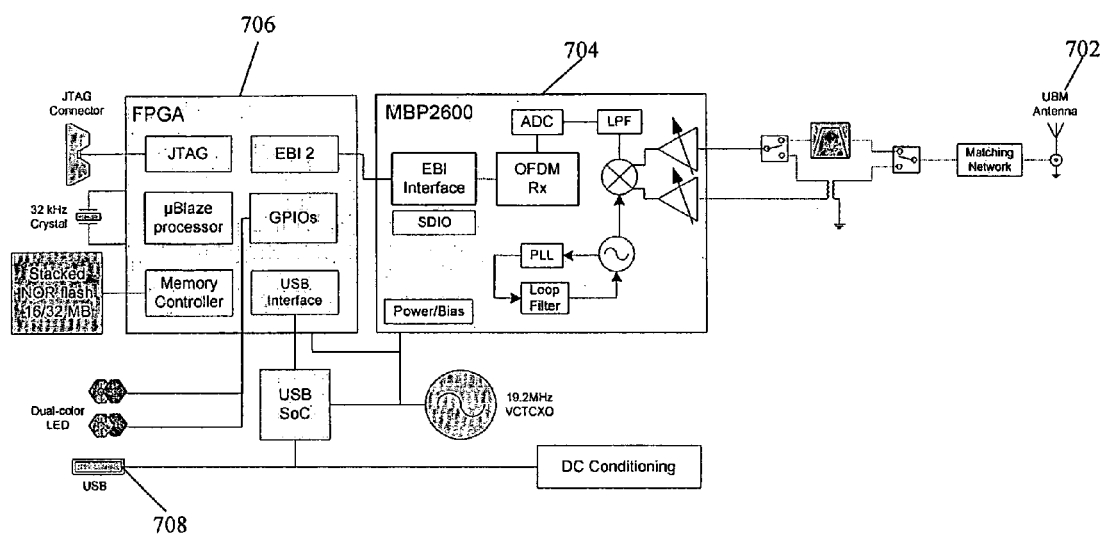
FIG. 7 is a block diagram of an exemplary USB transceiver.

FIG. 7 is a block diagram of an exemplary USB transceiver detailed in FIGS. 1-6. A radio frequency (RF) wireless communications signal received from the antenna 702 is input to mobile TV receiver Integrated Circuitry 704. The RF signal is down-converted to baseband frequencies by the TV receiver IC 704 and output to a Field Programmable Gate Array (FPGA) IC 705 for demodulation and processing. The demodulated TV video and audio signals are then provided to the USB port of the wireless device through USB connector 708.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed:

1. A transceiver comprising:
a housing lying in a plane having a male connector at one end;
an antenna assembly disposed about said housing on an opposite end of an axis there through, said antenna assembly being rotatable about said axis and through said plane and including a first elongated section coaxially disposed with a second elongated section, said first elongated section being at least partially retractable within and at least partially extendable through said second elongated section; and an impedance matching device spaced apart from said axis and connected to said first elongated section, said impedance matching device including a cap having a cavity capable of covering a plug in connection with rotating said antenna assembly in line with said connector and retracting said first elongated section.

2. The transceiver of claim 1, wherein said antenna assembly comprises a loop antenna.

3. The transceiver of claim 1 wherein said antenna assembly includes a first antenna and a second antenna, said first antenna and said second antenna each including the first elongated section and the second elongated section extending from said axis, the first antenna and the second antenna lying in spaced apart relation about said housing, the first elongated section of said first antenna being flexibly detachable from said impedance matching device.

4. The transceiver of claim 1 wherein the male connector comprises a USB male connector and the plug in connection comprises a USB plug in connection.

5. A transceiver comprising:
an adaptor;
a retractable antenna coupled to the adaptor; and
a cap, coupled to the retractable antenna, for protecting the adaptor when the antenna is retracted, wherein the adaptor, antenna and cap lie in a plane rotatable by 360 degrees about an axis of the plane and the antenna is rotatable away from the adaptor about the axis.

6. The transceiver of claim 5 wherein the retractable antenna receives diversity signals.

7. The transceiver of claim 6 wherein the diversity signals comprise digital mobile TV services in standards including at least one of DVB-H, DVTDVB-T, ISDB-T, or CMMB.

8. The transceiver of claim 5 wherein the cap comprises top loading for improved antenna performance.

9. The transceiver of claim 5 wherein the antenna comprises a loop antenna.

10. The transceiver of claim 5 wherein the antenna comprises one antenna.

11. The transceiver of claim 5 wherein the antenna comprises two independent antennas.

12. The transceiver of claim 11 wherein a first arm of the antenna can be detached to provide two independent antennas.

13. The transceiver of claim 5 wherein the antenna is rotatable away from interference generated by a device coupled to the adaptor.

14. The transceiver of claim 5 wherein the cap comprises and impedance matching device.

15. The transceiver of claim 5 wherein the adaptor comprises a USB adaptor.

16. An attached protective cover of a device having a body comprising:
a cap assembly including a telescoping antenna and connector associated therewith,
wherein the cap assembly lies in a plane rotatable by 360 degrees about an axis of the plane, the axis being along an edge of the connector and the cap assembly being rotatable away from the connector about the axis.

17. The protective cover of claim 16 wherein the telescoping antenna receives diversity signals.

18. The protective cover of claim 17 wherein the diversity signals comprise digital mobile TV services in standards including at least one of DVB-H, DVTDVB-T, ISDB-T, or CMMB.

19. The protective cover of claim 16 wherein the cap assembly further comprises top loading for improved antenna performance.

20. The protective cover of claim 16 wherein the antenna comprises a loop antenna.

21. The protective cover of claim 16 wherein the antenna comprises one antenna.

22. The protective cover of claim 16 wherein the antenna comprises two independent antennas.

23. The protective cover of claim 16 wherein a first arm of the antenna can be detached to provide two independent antennas.

24. The protective cover of claim 16 wherein the antenna is rotatable away from interference generated by a device coupled to the adaptor.

25. The protective cover of claim 16 wherein the cap comprises and impedance matching device.

26. The protective cover of claim 16 wherein the connector comprises a USB connector.

27. A transceiver comprising:
a rotatable antenna for receiving a radio frequency wireless signal;
a television receiver integrated circuit for down converting the received wireless signal to baseband frequencies;
a field programmable gate array for demodulating and processing the baseband signal; and
a connector for providing the demodulated and processed baseband signal to a port of a wireless device, wherein the rotatable antenna is rotatable by 360 degrees about an axis along an end of the connector.

28. The transceiver of claim 27 wherein the rotatable antenna receives digital mobile TV services in standards including at least one of DVB-H, DVTDVB-T, ISDB-T, or CMMB.

29. The transceiver of claim 27 wherein the connector comprises a USB connector and the port comprises a USB port.

30. A transceiver comprising:
a housing lying in a plane having a connector at one end; and
an antenna assembly disposed about said housing on an opposite end of an axis there through, said antenna assembly being rotatable about said axis and through said plane and including a first elongated section coaxially disposed with a second elongated section, said first elongated section being at least partially retractable within and at least partially extendable through said second elongated section.

* * * * *